(12) United States Patent  
Tsumiyama et al.

(10) Patent No.: US 9,108,559 B1
(45) Date of Patent: Aug. 18, 2015

(54) UTILITY VEHICLE

(71) Applicant: KAWASAKI JUKOGYO KABUSHIKI KAISHA, Hyogo (JP)

(72) Inventors: Yoshinori Tsumiyama, Miki (JP); Keiji Takahashi, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/585,734

(22) Filed: Dec. 30, 2014

(51) Int. Cl.
*B62D 33/02* (2006.01)
*B60P 1/28* (2006.01)
*B60R 21/13* (2006.01)
*B60R 9/06* (2006.01)

(52) U.S. Cl.
CPC . *B60P 1/28* (2013.01); *B60R 9/065* (2013.01); *B60R 21/13* (2013.01)

(58) Field of Classification Search
CPC ............ B60P 1/28; B60R 9/065; B60R 21/13
See application file for complete search history.

(56) References Cited

U.S. PATENT DOCUMENTS

| 6,394,555 | B2 | 5/2002 | Mizuta et al. |
| 2007/0188008 | A1* | 8/2007 | Furman ...................... 298/17 R |
| 2010/0066152 | A1* | 3/2010 | King et al. ................... 298/17.7 |

FOREIGN PATENT DOCUMENTS

CA          2247514 A1 *  7/1999

* cited by examiner

*Primary Examiner* — Lori L Lyjak
(74) *Attorney, Agent, or Firm* — Wenderoth, Lind & Ponack, L.L.P.

(57) ABSTRACT

A utility vehicle according to the present invention comprises a chassis; a seat provided on the chassis; a cargo bed provided behind the seat and supported in a freely rotatable manner about a pivot of the chassis so as to be changeable between a dumping position in which a front portion of the cargo bed is raised and a normal position in which the front portion of the cargo bed is not raised; a cargo bed locking mechanism capable of locking the cargo bed positioned at the normal position to the chassis; and chassis side covers for covering at least part of the sides of the chassis in a vehicle width direction. Each of the outer faces of the chassis side covers in the vehicle width direction has a main body portion and a concave portion being recessed inward from the main body portion in the vehicle width direction. The cargo bed locking mechanism is provided inside the concave portion of the chassis side cover.

5 Claims, 10 Drawing Sheets

UTILITY VEHICLE

BACKGROUND OF THE INVENTION

1. Field of the Invention

The present invention relates to a utility vehicle, in particular, to a utility vehicle being configured so that its cargo bed can perform dumping operation.

2. Description of the Prior Art

For example, the specification of U.S. Pat. No. 6,394,555 discloses a utility vehicle comprising a cargo bed capable of performing dumping operation.

In the utility vehicle described in the above-mentioned document, the rear end portion of the cargo bed is rotatably supported by the chassis. In addition, the cargo bed can be raised from a normal position to a dumping position. A cargo bed locking mechanism that locks the cargo bed to the chassis at the time when the cargo bed is positioned at the normal position is provided at the side portion of the chassis.

However, the cargo bed locking mechanism of the above-mentioned conventional utility vehicle protrudes outward from the side portion of the chassis in the vehicle width direction and is provided so as to be exposed outside, thereby making contact with obstacles around the vehicle body in some cases, for example, during travelling.

SUMMARY OF THE INVENTION

The present invention has been devised in consideration of the above-mentioned problem, and an object of the present invention is to provide a utility vehicle capable of preventing a cargo bed locking mechanism from making contact with obstacles around the vehicle body.

In order to achieve the object, the present invention provides a utility vehicle comprising a chassis; one or a plurality of seat row(s) provided on the chassis; a cargo bed provided behind the seat row(s) and supported in a freely rotatable manner about a pivot of the chassis so as to be changeable between a dumping position in which a front portion of the cargo bed is raised and a normal position in which the front portion of the cargo bed is not raised; one or more cargo bed locking mechanisms capable of locking the cargo bed positioned at the normal position to the chassis; and chassis side covers for covering at least part of the sides of the chassis in a vehicle width direction; wherein each of the outer faces of the chassis side covers in the vehicle width direction has a main body portion and a concave portion being recessed inward from the main body portion in the vehicle width direction, and the cargo bed locking mechanism is provided inside the concave portion of the chassis side cover.

With the above-mentioned configuration, since the cargo bed locking mechanism is provided inside the concave portion of the chassis side cover, the cargo bed locking mechanism is prevented from making contact with obstacles around the vehicle body by the chassis side cover, whereby the cargo bed locking mechanism can be protected. In addition, since the cargo bed locking mechanism is enclosed with the chassis side cover, the appearance around the cargo bed locking mechanism can be improved.

The present invention having the above-mentioned configuration is preferably equipped with the following configurations.

(a) The chassis side cover has a through hole being open in the bottom portion of the concave portion, and the cargo bed locking mechanism has a locking portion provided on the chassis and a portion to be locked that is provided on the cargo bed and releasably locked to the locking portion via the through hole of the chassis side cover.

With the configuration (a), since the cargo bed locking mechanism has the locking portion mounted on the chassis and the portion to be locked that is provided on the cargo bed and releasably locked to the locking portion via the through hole of the chassis side cover, the locking portion of the cargo bed locking mechanism can be firmly fixed to the chassis, whereby the cargo bed can be fixed securely to the chassis.

(b) The utility vehicle comprises a ROPS for enclosing a boarding space in which the seat row(s) is arranged, the ROPS has a pair of left and right pillar portions positioned behind the seat row; the cargo bed has cargo bed side covers for covering the sides of the cargo bed; the outer faces of the cargo bed side covers in the vehicle width direction have wide portions and narrow portions provided in front of the wide portions and positioned inward from the wide portions in the vehicle width direction; and the narrow portions are positioned inward from the chassis side covers and the pillar portions of the ROPS in the vehicle width direction when the cargo bed is positioned at the normal position.

With the configuration (b), when the cargo bed is positioned at the normal position, the narrow portions are positioned inward from the chassis side covers and the pillar portions of the ROPS in the vehicle width direction. Hence, the distance between the pillar portions of the ROPS in the vehicle width direction is maximized, whereby the strength of the ROPS in the vehicle width direction can be maintained or improved, the cargo bed can be extended to the space between the pillar portions, and the loading area of the cargo bed can be made larger.

(c) The utility vehicle comprises a storage box provided below the cargo bed to store equipment; the storage box has a box body portion and a lid portion detachably mounted on the box body portion to cover the opening of this box body portion; and part of the lid portion constitutes part of the peripheral wall portion of the concave portion of the chassis side cover.

With the configuration (c), since part of the lid portion constitutes part of the peripheral wall portion of the concave portion of the chassis side cover, when the lid portion is removed, the accessibility into the storage box can be improved by the concave portion.

(d) The utility vehicle comprises elastic members provided between the chassis and the cargo bed positioned at the normal position.

With the configuration (d), since the elastic members are provided between the chassis and the cargo bed positioned at the normal position, direct contact between the chassis and the cargo bed can be prevented, and the chassis and the cargo bed can be fixed more securely by the deflection of the elastic members.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

FIGS. 1 to 10 show a utility vehicle according to the present invention, and on the basis of these drawings, an embodiment of the present invention will be described. For convenience of explanation, an advancing direction of the utility vehicle is explained as the "front" of the utility vehicle and the respective components thereof, and the left-right direction as viewed from the driver or the passenger of the vehicle is explained as the "left-right direction" of the vehicle and the respective components thereof.

Figure 1:
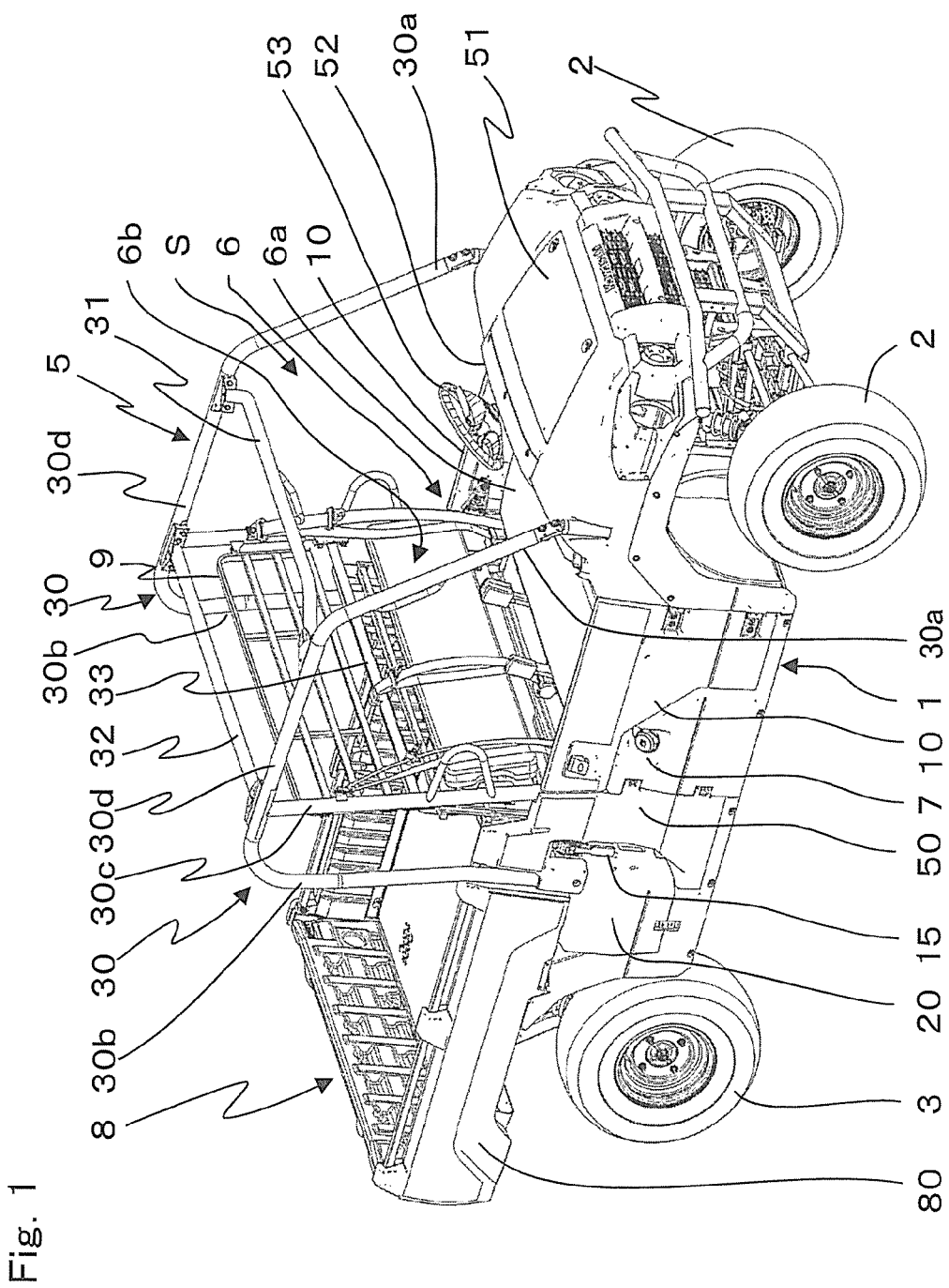
FIG. 1 is a perspective view showing a utility vehicle according to the present invention, viewed from the diagonally right front.

FIG. 1 is a perspective view showing the utility vehicle according to the present invention, viewed from the diagonally right front. The utility vehicle is used mainly for running in off-road circumstances like a grass field, a gravel field, and a sand field as well as an unpaved mountain path, an unpaved path through woods, a mud path, and a rocky field.

As shown in FIG. 1, a pair of left and right front wheels 2 is provided at a front portion of a chassis 1 of the utility vehicle, and a pair of left and right rear wheels 3 is provided at a rear portion of the chassis 1. Chassis side covers 50 for covering the sides of the chassis 1 are provided on the side portions of the chassis 1. A boarding space S between the front wheels 2 and the rear wheels 3 is enclosed with a ROPS 5. ROPS 5 is herein an abbreviation for rollover protective structure. A bench-type seat 6 is provided in the boarding space S. This seat 6 has a one-row seat configuration. Doors 10 are provided on the left and right sides of the seat 6. A fuel tank 7 is provided below the seat 6. A cargo bed 8 is provided behind the seat 6.

A pair of left and right cargo bed locking mechanisms 15 for locking the cargo bed 8 to the chassis 1 is provided on the front portion of the cargo bed 8. Cargo bed side covers 80 for covering the sides of the cargo bed 8 are provided on the side portions of the cargo bed 8. A storage box 20 is provided on the lower right side of the cargo bed 8 and in front of the rear wheels 3. A screen 9 is provided between the cargo bed 8 and the boarding space S and above the backrest 6b of the seat 6. A bonnet 51 is provided in front of the boarding space S, and a dashboard 52 is provided on the rear upper end portion of the bonnet 51. A steering wheel apparatus 53 and a shift lever apparatus, not shown, are provided on the dashboard 52 in a range where the driver sitting in the driver region 6a of the seat 6 can operate them.

The ROPS 5 comprises a pair of left and right side units 30 made of metal pipes and first to third cross members 31 to 33 made of metal pipes and used to connect both the side units 30. Each side unit 30 comprises a front pillar portion 30a, a rear pillar portion 30b, an intermediate pillar portion 30c and an upper beam portion 30d. The front pillar portion 30a, the rear pillar portion 30b, the intermediate pillar portion 30c and the upper beam portion 30d are single-membered.

The front pillar portion 30a, the rear pillar portion 30b and the upper beam portion 30d are formed by bending a single pipe having a circular cross-sectional shape to a nearly U-shape in a side view. The upper beam portions 30d are connected to each other with the first and second cross members 31 and 32. The intermediate pillar portion 30c extends in a nearly up-down direction at a position nearly corresponding to the backrest 6b of the seat 6. The upper end portion of the intermediate pillar portion 30c is fixed to the middle portion of the upper beam portion 30d in the front-rear direction by welding. The intermediate pillar portions 30c are connected to each other with the third cross member 33 at the nearly central portion thereof in the up-down direction. The boarding space S is provided between both the side units 30 and is defined as a space enclosed by the front pillar portions 30a, the intermediate pillar portions 30c and the upper beam portions 30d.

The outer face of the chassis side cover 50 in the vehicle width direction has a shape corresponding to the outer face of the door 10 in the vehicle width direction and corresponding to the outer face of the cargo bed side cover 80 of the cargo bed 8 in the vehicle width direction. The front wheels 2, the rear wheels 3, the fuel tank 7 and the storage box 20 are positioned inward from the outer faces of the chassis side covers 50 in the vehicle width direction.

Figure 2:
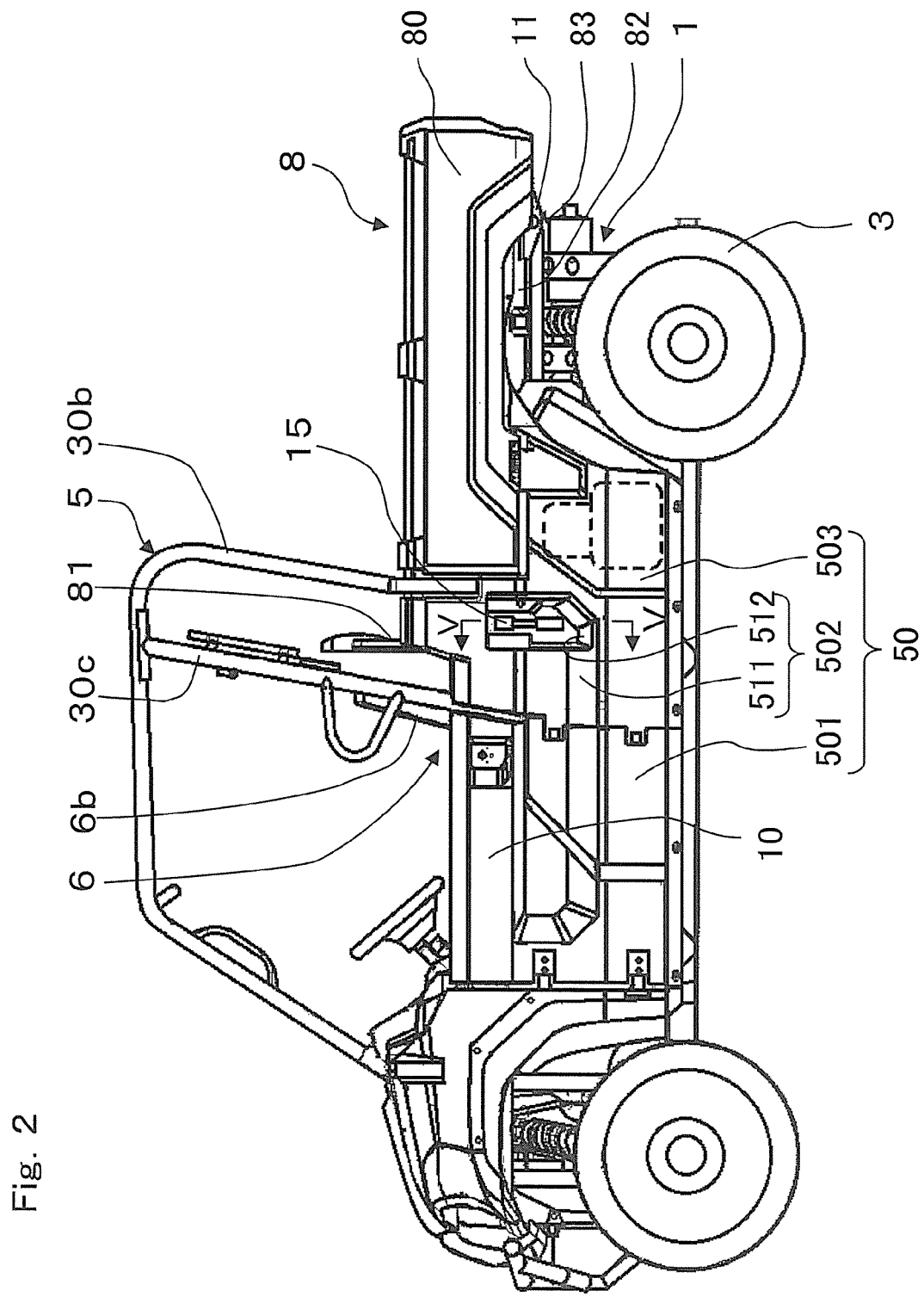
FIG. 2 is a left side view showing the utility vehicle.

FIG. 2 is a left side view showing the utility vehicle. FIG. 2 shows a case in which the cargo bed 8 is positioned at the normal position (a non-dumping position).

As shown in FIG. 2, the cargo bed 8 extends rearward from the vicinity of the backrest 6b of the seat 6 in a nearly horizontal direction. The cargo bed 8 has a front end portion 81, a lower frame 82 and a bracket 83 provided at the rear end portion of this lower frame 82. The front portion of the cargo bed 8 is locked to the chassis 1 by the cargo bed locking mechanisms 15.

A pivot 11 provided at the rear end portion of the chassis 1 is inserted into the bracket 83. The cargo bed 8 is rotatably supported by the pivot 11. With this configuration, the front end portion 81 of the cargo bed 8 can be raised and lowered around the pivot 11; in other words, dumping operation can be performed.

The chassis side cover 50 has a first left side cover 501, a second left side cover 502 and a third left side cover 503. The first left side cover 501 is positioned behind the lower side of the door 10. The second left side cover 502 is positioned behind the door 10 and the first left side cover 501 and between the intermediate pillar portion 30c of the ROPS 5 and the rear pillar portion 30b. The upper side of the second left side cover 502 covers the outside of the cargo bed 8 in the vehicle width direction. The third left side cover 503 is positioned behind the second left side cover 502 and below the cargo bed 8.

The outer face of the second left side cover 502 in the vehicle width direction has a main body portion 511 and a concave portion 512 being recessed inward from this main body portion 511 in the vehicle width direction. This concave portion 512 is positioned nearly at the center of the outer face. The cargo bed locking mechanism 15 is provided inside the concave portion 512.

Figure 3:
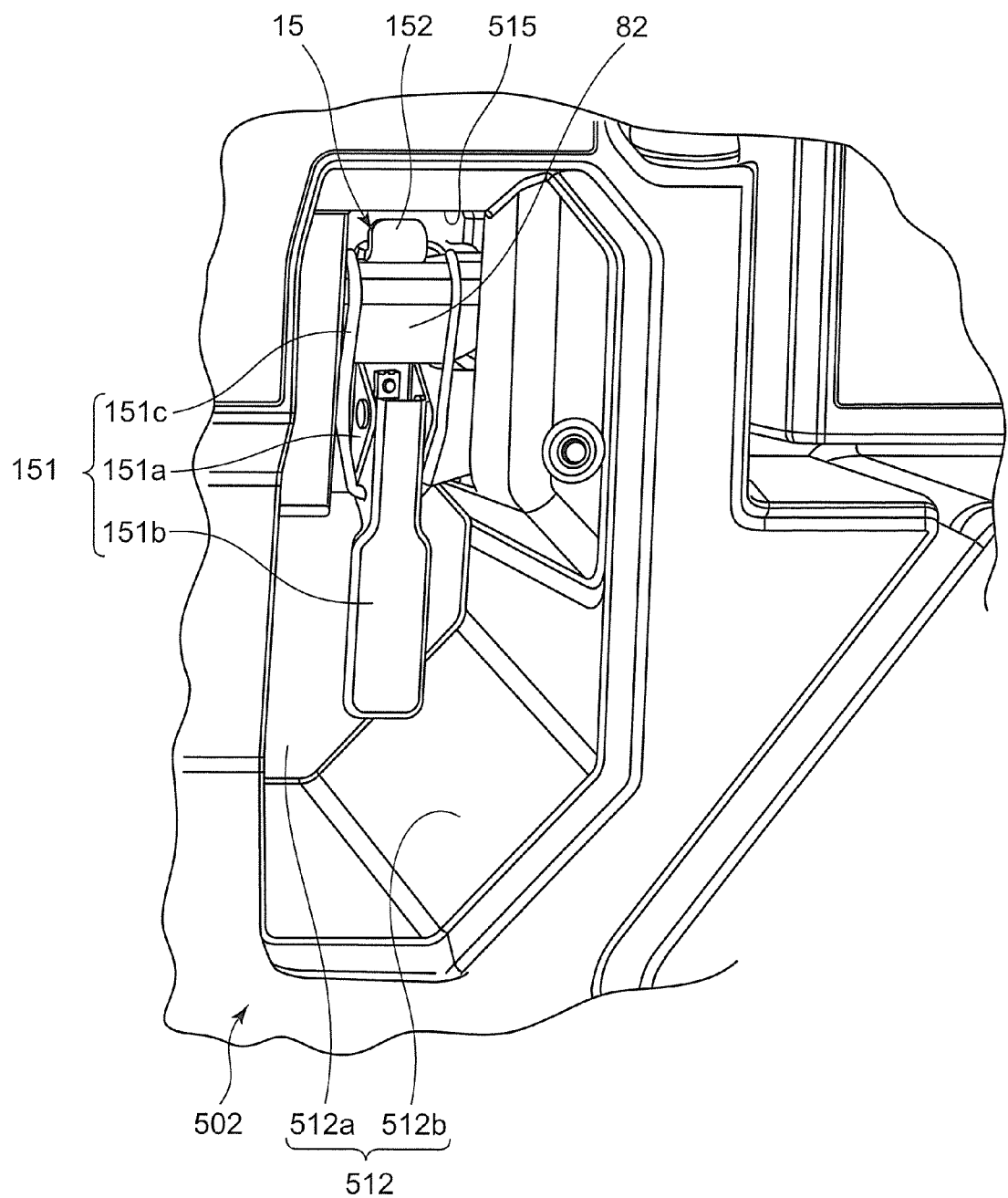
FIG. 3 is an enlarged perspective view showing the vicinity of the cargo bed locking mechanism shown in FIG. 2, viewed from the diagonally left front.
Figure 4:
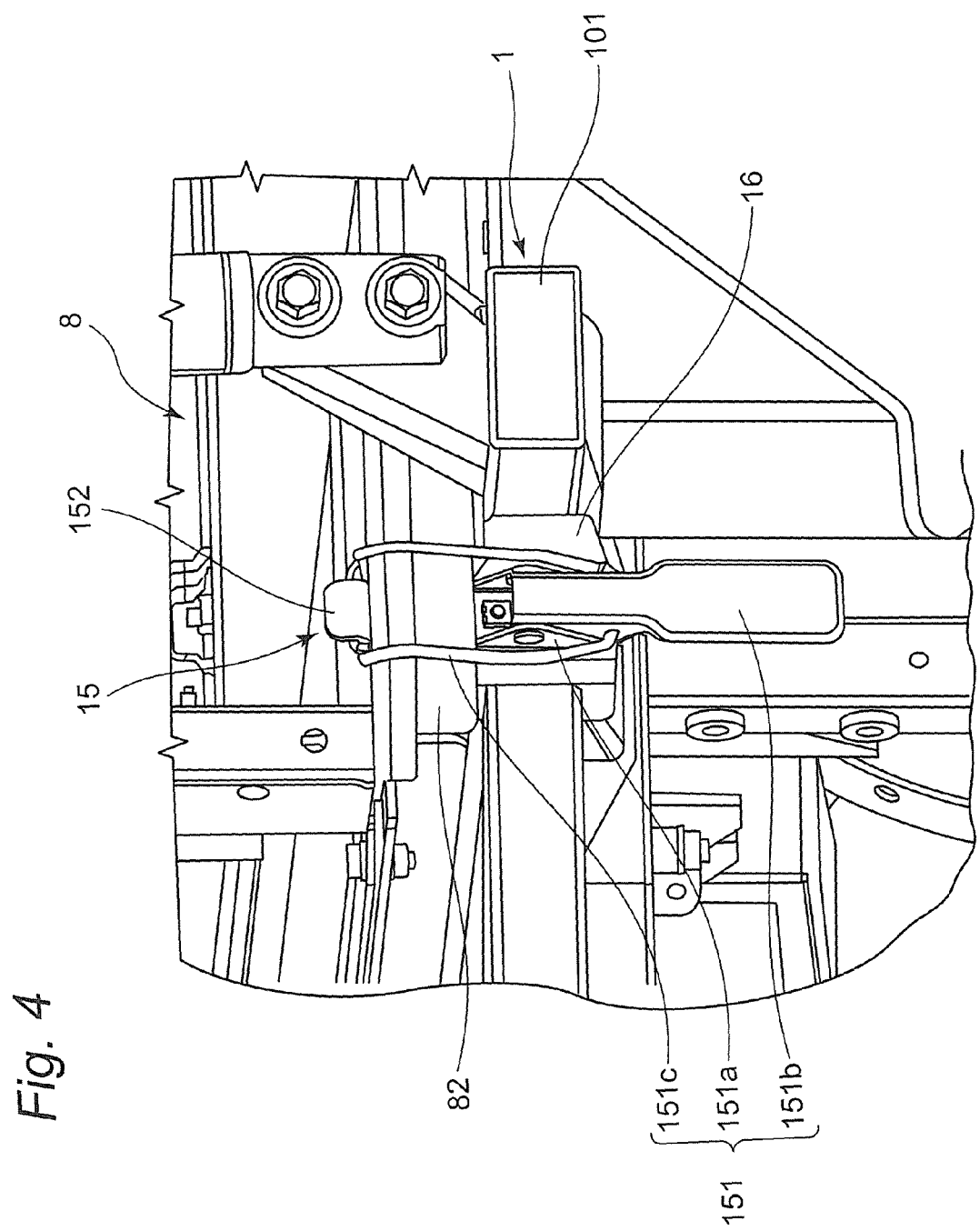
FIG. 4 is an enlarged perspective view, with the chassis side cover and the cargo bed side cover shown in FIG. 3 omitted.

FIG. 3 is an enlarged perspective view showing the vicinity of the cargo bed locking mechanism 15 shown in FIG. 2, viewed from the diagonally left front. FIG. 4 is a perspective view, with the second left side cover 502 of the chassis side cover 50 and the cargo bed side covers 80 shown in FIG. 3 omitted.

As shown in FIGS. 3 and 4, the concave portion 512 of the second left side cover 502 has a bottom portion 512a and a peripheral wall portion 512b. A through hole 515 is provided in the upper portion of the bottom portion 512a. This through hole 515 communicates with the lower frame 82 of the cargo bed 8.

The cargo bed locking mechanism 15 is a lever-type toggle clamp. The cargo bed locking mechanism 15 has a locking portion 151 and a portion 152 to be locked.

The locking portion 151 comprises a base member 151a, a lever 151b rotatably mounted on this base member 151a, and a band member 151c rotatably mounted on this lever 151b. The base member 151a is mounted on a bracket 16 that is welded to the cross pipe 101 of the main frame of the chassis 1. The portion 152 to be locked is provided so as to protrude upward from the lower frame 82 of the cargo bed 8. The locking portion 151 is configured so as to be lockable with the portion 152 to be locked by rotating the lever 151b downward while the end portion of the band member 151c is hooked to the portion 152 to be locked via the through hole 515 of the second left side cover 502.

Figure 5:
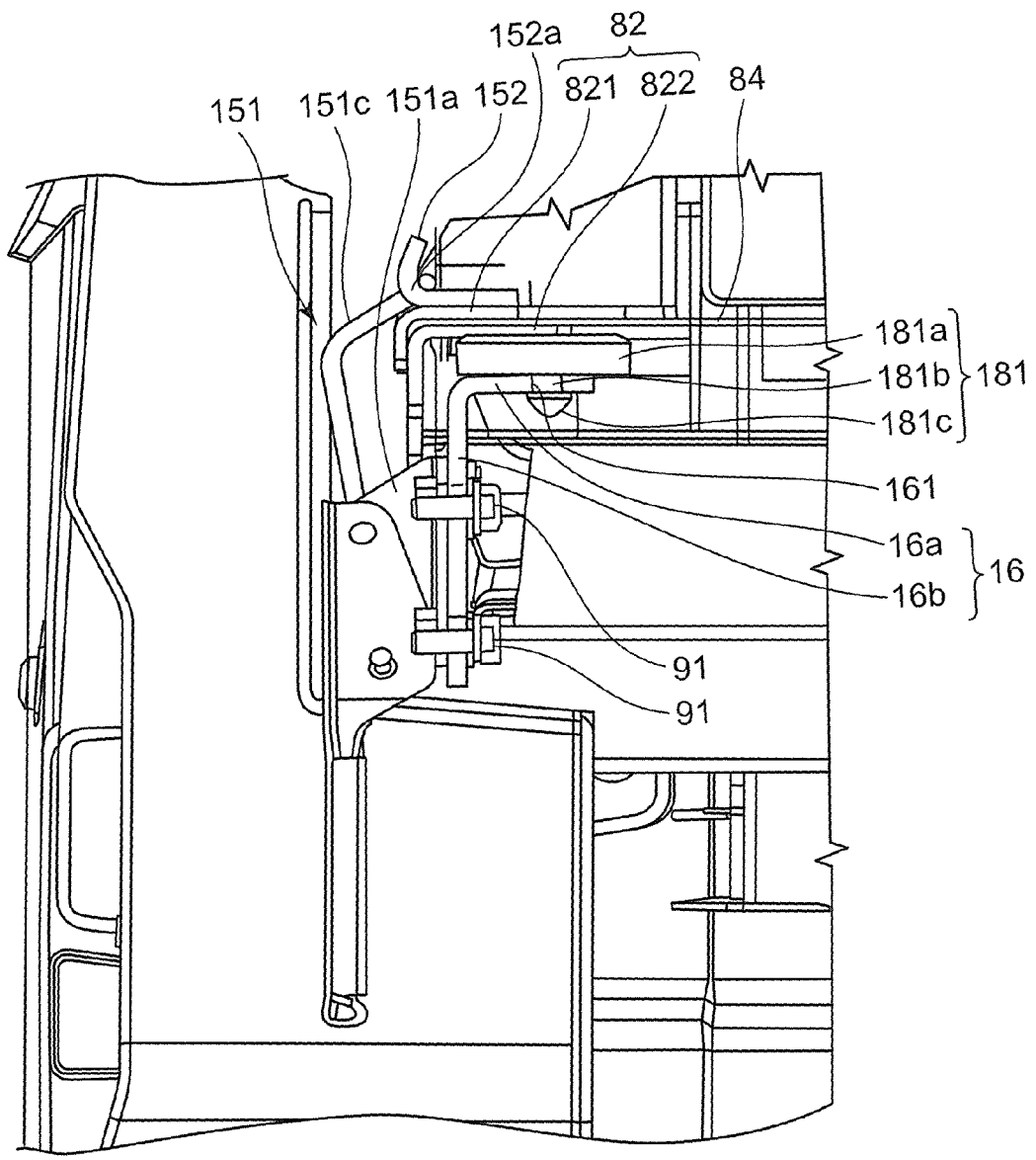
FIG. 5 is a cross-sectional view taken on line V-V of FIG. 2.
Figure 6:
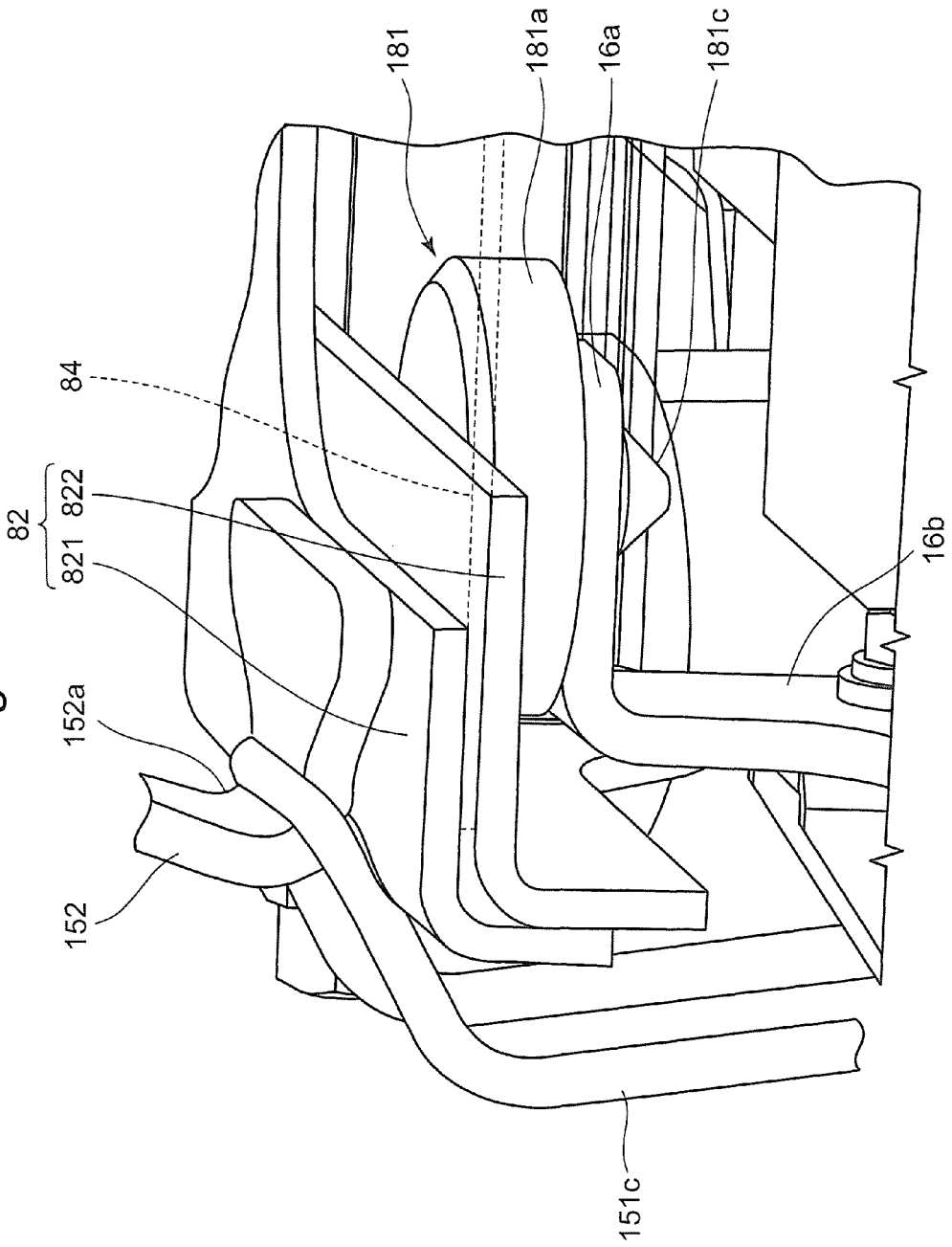
FIG. 6 is a fragmentary cross-sectional view showing the vicinity of the cargo bed locking mechanism shown in FIG. 2, viewed from the diagonally right rear.

FIG. 5 is a cross-sectional view taken on line V-V of FIG. 2. FIG. 6 is a fragmentary cross-sectional view showing the vicinity of the cargo bed locking mechanism 15 shown in FIG. 2, viewed from the diagonally right rear.

As shown in FIGS. 5 and 6, the lower frame 82 of the cargo bed 8 has a first frame 821 and a second frame 822. The first frame 821 and the second frame 822 are each formed of a metal member having a nearly L-shape in cross section and extend in parallel to each other in the front-rear direction. The bottom plate 84 of the cargo bed 8 is held between the first frame 821 and the second frame 822.

The portion 152 to be locked, having a nearly L-shape in cross section, is fixed to the upper face of the first frame 821 by welding. The band member 151c of the locking portion 151 is locked to the corner 152a of the portion 152 to be locked.

The bracket 16 of the chassis 1 is formed of a metal member having a nearly L-shape in cross section. The bracket 16 has a horizontal portion 16a extending in the front-rear direction in nearly parallel to the lower frame 82 of the cargo bed 8 and extending in a nearly horizontal direction and also has a vertical portion 16b extending in a nearly vertical direction.

An elastic member 181 having a nearly T-shape in cross section is mounted on the horizontal portion 16a. More specifically, the elastic member 181 has a head portion 181a having a nearly disc shape, a shaft portion 181b and a coming-off preventing portion 181c having a nearly conical shape. The head portion 181a is positioned on the upper face of the horizontal portion 16a and mounted on the upper face of the horizontal portion 16a with an adhesive. The head portion 181a is positioned between the bracket 16 of the chassis 1 and the second frame 822 of the cargo bed 8, thereby preventing direct contact (metal contact) between the bracket 16 and the second frame 822, that is, between the chassis 1 and the cargo bed 8. The shaft portion 181b is inserted into the through hole 161 passing through the horizontal portion 16a in the up-down direction. The horizontal portion 16a is held between the head portion 181a and the coming-off preventing portion 181c positioned at both the ends of the shaft portion 181b.

The base member 151a of the locking portion 151 is mounted on the vertical portion 16b using bolts 91.

Figure 7:
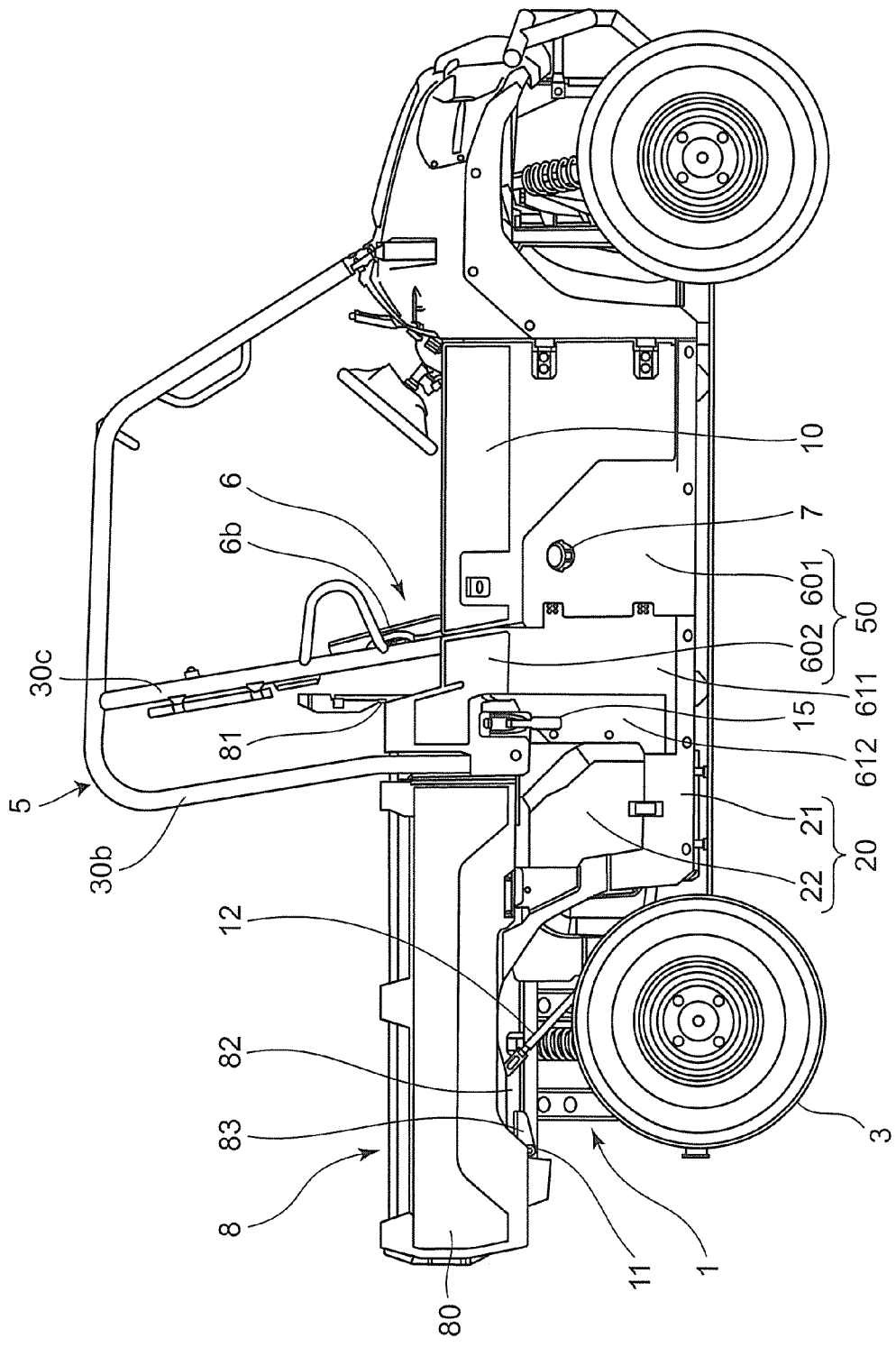
FIG. 7 is a right side view showing the utility vehicle.

FIG. 7 is a right side view showing the utility vehicle. This view is different from the left side view of FIG. 2 in that the chassis side cover 50 has a first right side cover 601 and a second right side cover 602. The storage box 20 is positioned between this second right side cover 602 and the rear wheel 3 and below the cargo bed 8. An air cylinder (gas damper) 12 serving as a mechanism for assisting the dumping operation is mounted at the rear portion of the lower frame 82 of the cargo bed 8. Since the components shown in this right side view and designated by the same reference numerals as those shown in the left side view have the same configurations, their descriptions are omitted.

The first right side cover 601 is positioned behind the lower side of the door 10 and covers the outside of the fuel tank 7 in the vehicle width direction. The second right side cover 602 is positioned behind the door 10 and the first right side cover 601 and between the intermediate pillar portion 30c of the ROPS 5 and the rear pillar portion 30b. The upper side of the second right side cover 602 covers the outside of the cargo bed 8 in the vehicle width direction.

The outer face of the second right side cover 602 in the vehicle width direction has a main body portion 611 and a concave portion 612 being recessed inward from this main body portion 611 in the vehicle width direction. This concave portion 612 is positioned nearly at the center of the outer face in the up-down direction. The cargo bed locking mechanism 15 is provided inside the concave portion 612.

The storage box 20 stores an air cleaner device, a battery, etc. for the engine, not shown. The storage box 20 has a box body portion 21 and a lid portion 22 detachably mounted on this box body portion 21 to cover the opening of the box body portion 21. The front side portion of the lid portion 22 faces the concave portion 612 of the chassis side cover 50.

The air cylinder 12 is positioned in front of the bracket 83 and above the rear wheels 3. The tip end portion of the piston rod (not shown) of the air cylinder 12 is attached to the chassis 1. The air cylinder 12 holds the cargo bed 8 while energizing the cargo bed 8 toward the dumping position.

Figure 8:
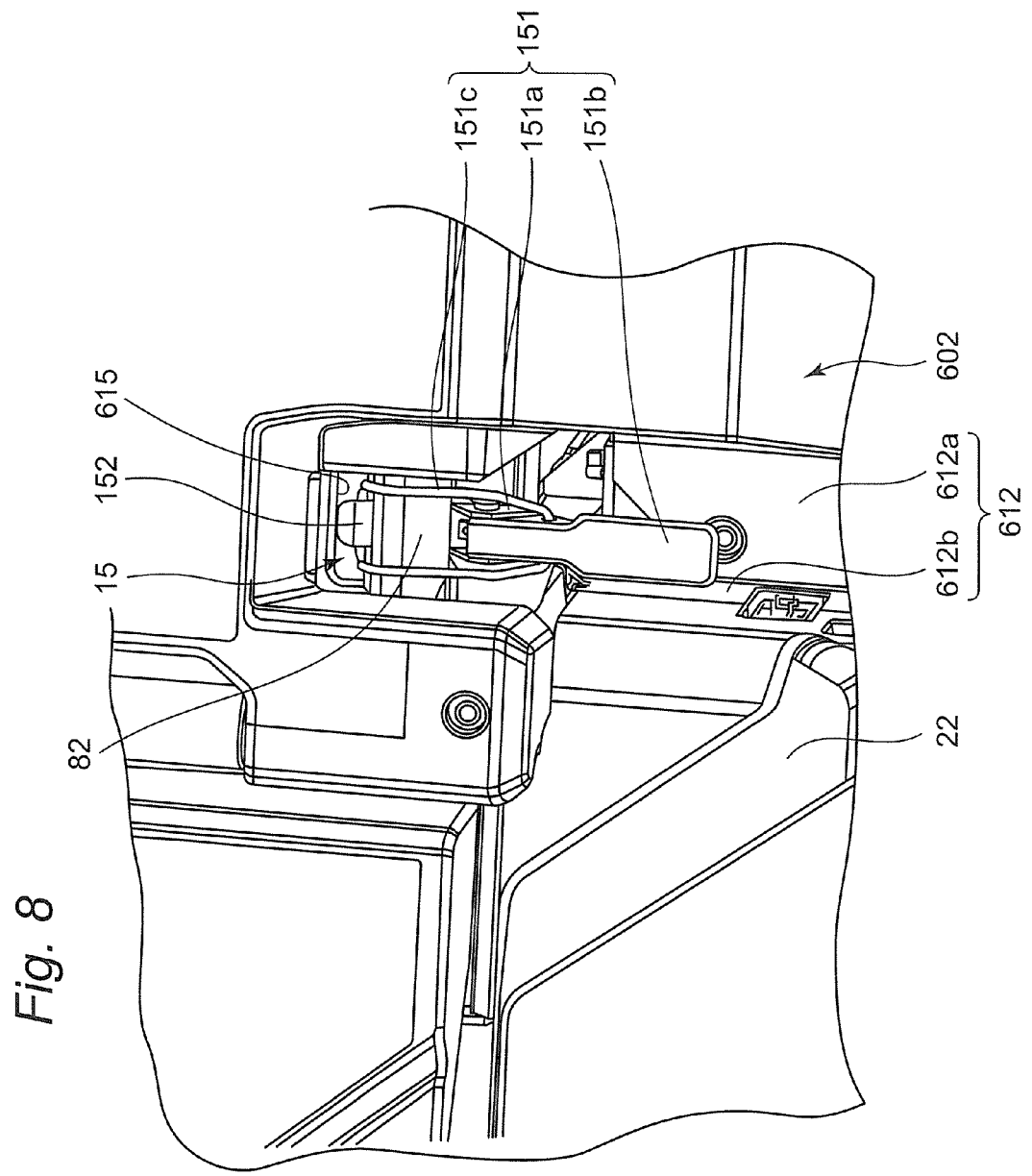
FIG. 8 is an enlarged perspective view showing the vicinity of the cargo bed locking mechanism shown in FIG. 7, viewed from the diagonally right front.

FIG. 8 is an enlarged perspective view showing the vicinity of the cargo bed locking mechanism 15 shown in FIG. 7, viewed from the diagonally right front. This view is different from FIG. 3 in that the concave portion 612 of the second right side cover 602 has a bottom portion 612a and a peripheral wall portion 612b. A through hole 615 is provided in the upper portion of the bottom portion 612a. This through hole 615 communicates with the lower frame 82 of the cargo bed 8. Furthermore, part of the front portion of the lid portion 22 of the storage box 20 constitutes part of the peripheral wall portion 612b of the concave portion 612. Since the cargo bed locking mechanism 15 has the same configuration as that of the cargo bed locking mechanism 15 shown in FIG. 3, its description is omitted.

Figure 9:
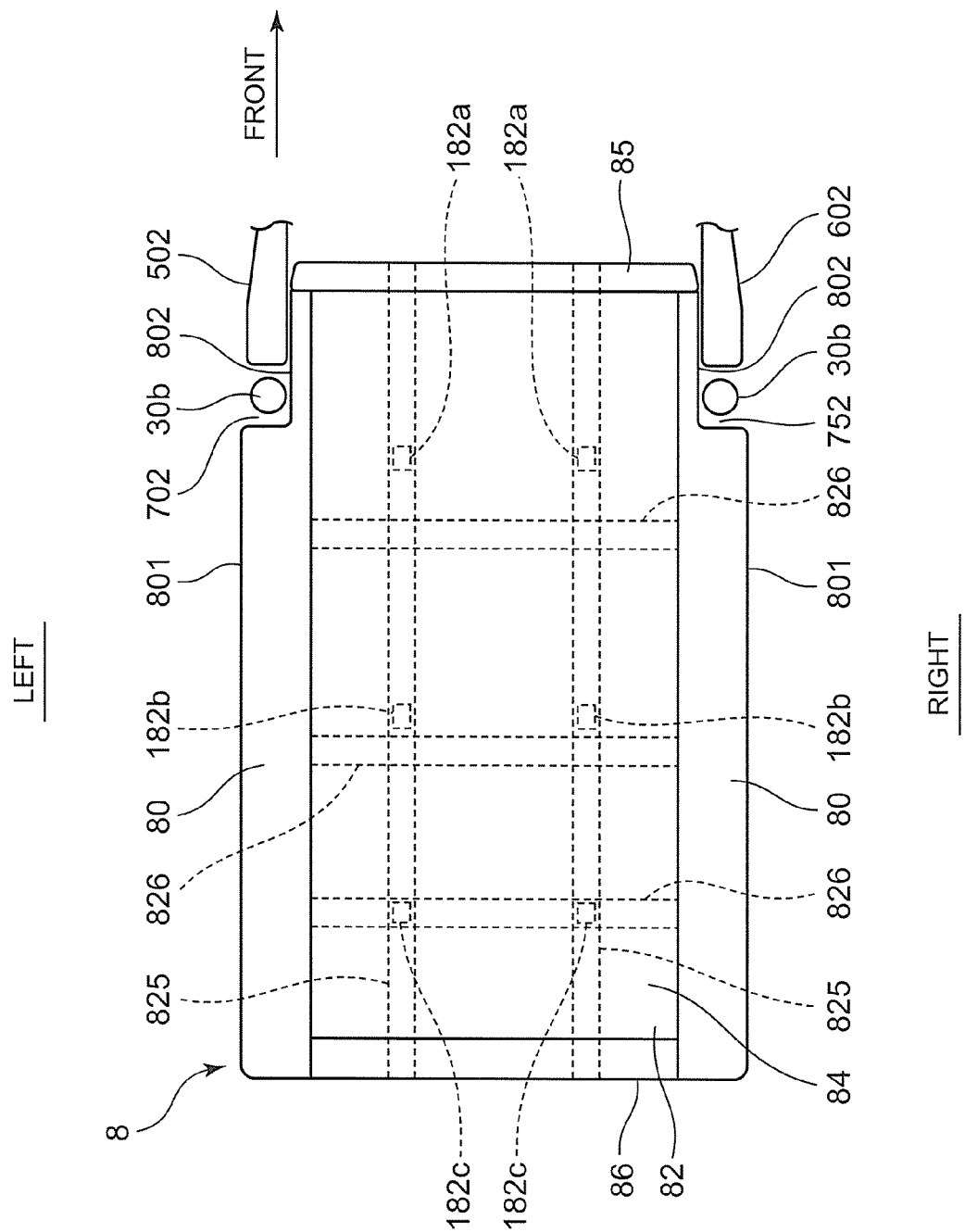
FIG. 9 is a schematic plan view showing the cargo bed of the utility vehicle and the vicinity thereof, viewed from above.

FIG. 9 is a schematic plan view showing the cargo bed 8 of the utility vehicle and the vicinity thereof, viewed from above when the cargo bed 8 is positioned at the normal position.

As shown in FIG. 9, the cargo bed 8 has the lower frame 82, the bottom plate 84 having a nearly rectangular shape and provided on the lower frame 82, the cargo bed side covers 80, a front end cover 85, and a rear end cover 86. The front end cover 85 is positioned at the front end of the cargo bed 8. On the other hand, the rear end cover 86 is positioned at the rear end of the cargo bed 8. The cargo bed side covers 80, the front end cover 85 and the rear end cover 86 are vertically arranged so as to enclose the periphery of the bottom plate 84.

The outer face of the cargo bed side cover 80 in the vehicle width direction has a wide portion 801 and a narrow portion 802 provided in front of this wide portion 801 and positioned inward from the wide portion 801 in the vehicle width direction. The narrow portions 802 are positioned inward from the second left side cover 502 and the second right side cover 602 of the chassis side covers 50 in the vehicle width direction. Furthermore, the narrow portions 802 are positioned inward from the rear pillar portions 30b of the ROPS 5 in the vehicle width direction.

The second left side cover 502 and the narrow portion 802 are combined to form a pillar-use concave portion 702 opening outward (leftward) in the vehicle width direction. The rear pillar portion 30b of the ROPS 5 is positioned inside this pillar-use concave portion 702. The second right side cover 602 and the narrow portion 802 are combined to form a pillar-use concave portion 752 opening outward (rightward) in the vehicle width direction. The rear pillar portion 30b of the ROPS 5 is positioned inside this pillar-use concave portion 752.

The lower frame 82 has two longitudinal frames 825 extending in parallel to each other in the front-rear direction and three transverse frames 826 extending in parallel to one another in the vehicle width direction. The lower frame 82 is formed into a lattice shape using the longitudinal frames 825 and the transverse frames 826.

Three elastic members 182a, 182b and 182c are provided on the lower face of each of the longitudinal frames 825. Each of these elastic members 182a, 182b and 182c is formed into a nearly rectangular shape in a plan view. The thickness of the elastic members 182a, 182b and 182c is smaller than the thickness of the head portion 181a of the elastic member 181. These elastic members 182a, 182b and 182c are arranged with intervals in the front-rear direction and bonded to the lower faces of the longitudinal frames 825 of the cargo bed 8 with an adhesive. The longitudinal frames 825 of the cargo bed 8 are prevented from making direct contact with the chassis 1 by the elastic members 182a, 182b and 182c.

Figure 10:
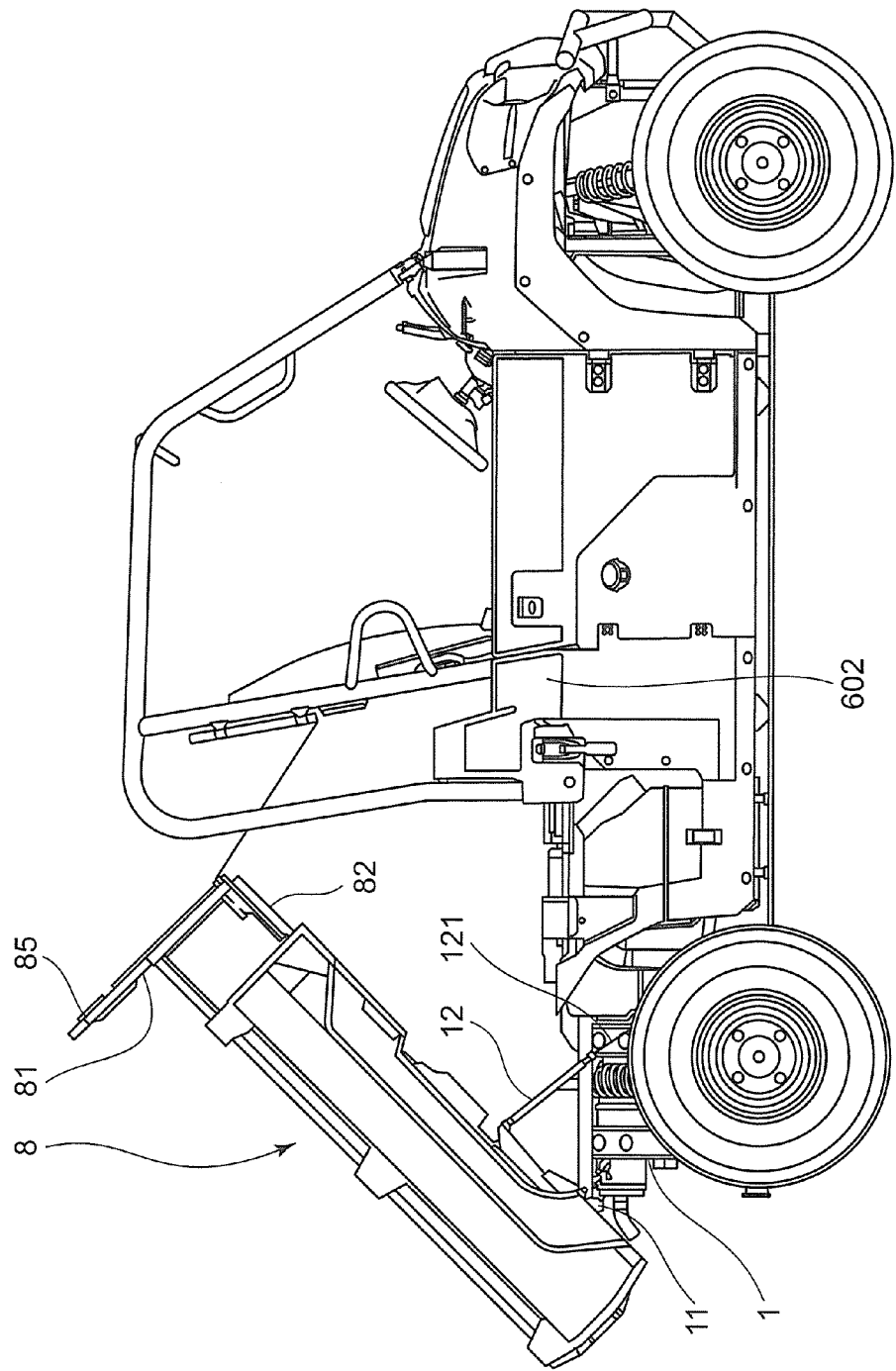
FIG. 10 is a right side view showing the utility vehicle, with the cargo bed raised to a dumping position.

The dumping operation of the cargo bed 8 will be described referring to FIGS. 7 and 10. FIG. 10 shows a state in which the cargo bed 8 has been raised to the dumping position.

First, the locked state of the cargo bed locking mechanism 15 is released. Next, as shown in FIG. 10, the front end portion 81 of the cargo bed 8 is raised by hand while using the energizing force of the air cylinder 12. As a result, the front end portion 81 of the cargo bed 8 is rotated around the pivot 11. In other words, the cargo bed 8 is rotated from the normal position to the dumping position. The dumping position is determined by the stroke limit of the air cylinder 12. The cargo bed 8 is held at the dumping position by the energizing force of the air cylinder 12.

Advantage of the Embodiment (1) Since the cargo bed locking mechanisms 15 are provided inside the concave portions 512 and 612 of the chassis side covers 50, the cargo bed locking mechanisms 15 are prevented from making contact with obstacles around the vehicle body by the chassis side covers 50, whereby the cargo bed locking mechanisms 15 can be protected. In addition, since the cargo bed locking mechanisms 15 are enclosed with the chassis side covers 50, the appearance around the cargo bed locking mechanisms 15 can be improved.

(2) Since the cargo bed locking mechanism 15 has the locking portion 151 mounted on the chassis 1 and the portion 152 to be locked that is provided on the cargo bed 8 and releasably locked to the locking portion 151 via the through hole 515 of the chassis side cover 50, the locking portion 151 of the cargo bed locking mechanism 15 can be firmly fixed to the chassis 1, whereby the cargo bed 8 can be fixed securely to the chassis 1.

(3) Since the thickness of the head portion 181a of the elastic member 181 in the vicinity of the locking mechanism 15 of the chassis 1 is larger than the thickness of the elastic members 182a, 182b and 182c of the cargo bed 8, when the cargo bed 8 is fixed using the cargo bed locking mechanisms 15, the head portion 181a of the elastic member 181 is mainly compressed and deflected, whereby the cargo bed 8 can be fixed stably.

(4) When the cargo bed 8 is positioned at the normal position, the narrow portions 802 are positioned inward from the chassis side covers 50 and the pillar portions 30b of the ROPS 5 in the vehicle width direction. Hence, the distance between the pillar portions 30b of the ROPS 5 in the vehicle width direction is maximized, whereby the strength of the ROPS 5 in the vehicle width direction can be maintained or improved, the cargo bed 8 can be extended to the space between the pillar portions 30b, and the loading area of the cargo bed 8 can be made larger. Furthermore, since the pillar portions 30b are partially covered with the chassis side covers 50 and the cargo bed side covers 80, the appearance around the pillar portions 30b can be improved.

(5) Since part of the lid portion 22 of the storage box 20 constitutes part of the peripheral wall portion 612b of the concave portion 612 of the chassis side cover 50, when the lid portion 22 is removed, the accessibility into the storage box 20 can be improved by the concave portion 612.

(6) Since the elastic members 181 and 182 are provided between the chassis 1 and the cargo bed 8 positioned at the normal position, direct contact, that is, metal contact, between the chassis 1 and the cargo bed 8 can be prevented, and the chassis 1 and the cargo bed 8 can be fixed to each other more securely by the deflection of the elastic members 181 and 182.

Other Embodiments (1) Although the cargo bed locking mechanisms 15 are provided as a left and right pair at the front portion of the cargo bed 8 in the above-mentioned embodiment, without being limited to this configuration, the cargo bed locking mechanism 15 may be provided only on either the left or right side.

(2) Although the chassis side covers 50 are used to cover almost all the sides of the chassis 1 in the above-mentioned embodiment, without being limited to this configuration, the chassis side covers 50 may cover part of the sides of the chassis.

(3) Although the through holes 515 and 612 are provided in the bottom portions 512a and 612a of the concave portions 512 and 612 of the chassis side covers 50 in the above-mentioned embodiment, the configuration thereof is not limited to this configuration. For example, the through holes may be provided in the peripheral wall portions of the concave portions of the chassis side covers.

(4) Although the cargo bed locking mechanism 15 is a lever-type toggle clamp in the above-mentioned embodiment, without being limited to this configuration, the cargo bed locking mechanism may be another type of locking mechanism.

(5) Although the outer faces of the cargo bed side covers 80 in the vehicle width direction have the wide portions 801 and the narrow portions 802 in the above-mentioned embodiment, the configuration thereof is not limited to this configuration. For example, no convex and concave portions are provided on the outer faces of the cargo bed side covers in the vehicle width direction, and the length of the cargo bed in the vehicle width direction may be constant.

(6) Although part of the front side portion of the lid portion 22 of the storage box 20 constitutes part of the peripheral wall portion 612b of the concave portion 612 in the above-mentioned embodiment, the configuration thereof is not limited to this configuration. For example, the lid portion of the storage box may not constitute part of the peripheral wall portion of the concave portion of the chassis side cover, but the peripheral wall portion may be formed at the central portion of the chassis side cover.

(7) Although the elastic member 181 is mounted on the bracket 16 of the chassis 1 and the elastic members 182a, 182b and 182c are mounted on the longitudinal frames 825 of the cargo bed 8 in the above-mentioned embodiment, the configuration thereof is not limited to this configuration. For example, the elastic members may be mounted on the transverse frames 826 of the cargo bed 8, or all the elastic members may be mounted on either the chassis or the cargo bed. Furthermore, the elastic members may not be provided between the cargo bed and the chassis.

(8) Although each of the elastic members 182a, 182b and 182c is formed into a nearly rectangular shape in a plan view in the above-mentioned embodiment, the configuration thereof is not limited to this configuration. For example, each of the elastic members may be formed into a different shape, such as a circular shape or a triangular shape.

(9) Although the front wheels 2, the rear wheels 3, the fuel tank 7 and the storage box 20 are positioned inward from the outer faces of the chassis side covers 50 in the vehicle width direction in the above-mentioned embodiment, the configuration thereof is not limited to this configuration. For example, at least the front wheels or the rear wheels may be positioned outward from the outer faces of the chassis side covers.

(10) Although the seat 6 has a one-row seat configuration in the above-mentioned embodiment, the seat may have a two-row seat configuration or a seat configuration having three or more rows.

(11) The present invention is not limited to the structure of the above-mentioned embodiment, but includes various modifications that can be devised without departing from the contents described in the appended claims.

What is claimed is:

1. A utility vehicle comprising:
a chassis;
one or a plurality of seat row(s) provided on the chassis;
a cargo bed provided behind the seat row(s) and supported in a freely rotatable manner about a pivot of the chassis so as to be changeable between a dumping position in which a front portion of the cargo bed is raised and a normal position in which the front portion of the cargo bed is not raised;
one or more cargo bed locking mechanisms capable of locking the cargo bed positioned at the normal position to the chassis; and
chassis side covers for covering at least part of the sides of the chassis in a vehicle width direction; wherein
each of the outer faces of the chassis side covers in the vehicle width direction has a main body portion and a concave portion being recessed inward from the main body portion in the vehicle width direction, and
the cargo bed locking mechanism is provided inside the concave portion of the chassis side cover.

2. The utility vehicle according to claim 1, wherein
the chassis side cover has a through hole being open in the bottom portion of the concave portion, and
the cargo bed locking mechanism has:
a locking portion provided on the chassis and
a portion to be locked that is provided on the cargo bed and releasably locked to the locking portion via the through hole of the chassis side cover.

3. The utility vehicle according to claim 1, further comprising:
a ROPS for enclosing a boarding space in which the seat row is arranged, wherein
the ROPS has a pair of left and right pillar portions positioned behind the seat row(s),
the cargo bed has cargo bed side covers for covering the sides of the cargo bed,
the outer faces of the cargo bed side covers in the vehicle width direction have wide portions and narrow portions provided in front of the wide portions and positioned inward from the wide portions in the vehicle width direction, and
the narrow portions are positioned inward from the chassis side covers and the pillar portions of the ROPS in the vehicle width direction when the cargo bed is positioned at the normal position.

4. The utility vehicle according to claim 1, further comprising:
a storage box provided below the cargo bed to store equipment, wherein
the storage box has a box body portion and a lid portion detachably mounted on the box body portion to cover the opening of this box body portion, and
part of the lid portion constitutes part of the peripheral wall portion of the concave portion of the chassis side cover.

5. The utility vehicle according to claim 1, further comprising:
elastic members provided between the chassis and the cargo bed positioned at the normal position.

* * * * *